United States Patent
Grant, Sr.

(10) Patent No.: US 6,547,845 B2
(45) Date of Patent: Apr. 15, 2003

(54) FILTERED VACUUM VAULT FOR STORING COLLECTIBLES

(75) Inventor: James E. Grant, Sr., Naugatuck, CT (US)

(73) Assignee: James E. Grant, Naugatuck, CT (US)

( * ) Notice: Subject to any disclaimer, the term of this patent is extended or adjusted under 35 U.S.C. 154(b) by 0 days.

(21) Appl. No.: 09/915,253

(22) Filed: Jul. 26, 2001

(65) Prior Publication Data

US 2003/0041736 A1 Mar. 6, 2003

(51) Int. Cl.⁷ .............................................. B01D 29/00
(52) U.S. Cl. ........................ 55/385.1; 96/421; 312/1; 312/114; 312/236
(58) Field of Search ............................. 55/385.1, 385.4; 312/1, 114, 236; 96/421

(56) References Cited

U.S. PATENT DOCUMENTS

| | | | |
|---|---|---|---|
| 3,181,913 A | * | 5/1965 | Guido et al. ................ 312/114 |
| 3,751,128 A | * | 8/1973 | Skinner et al. ............. 312/114 |
| 3,943,987 A | | 3/1976 | Rossi |
| 4,051,971 A | | 10/1977 | Saleri |
| 5,165,767 A | * | 11/1992 | Sakai ......................... 312/114 |
| 5,238,648 A | | 8/1993 | Kremen |
| 5,638,971 A | | 6/1997 | Justesen |
| 5,718,494 A | * | 2/1998 | Luddeman .................. 312/114 |
| 5,791,075 A | | 8/1998 | Martel |
| 5,855,634 A | * | 1/1999 | Berfield .................. 55/DIG. 3 |
| 5,992,666 A | | 11/1999 | Wu |
| 6,024,775 A | * | 2/2000 | Miller et al. ............... 55/385.1 |
| 6,110,248 A | * | 8/2000 | Liu ......................... 55/DIG. 3 |

\* cited by examiner

Primary Examiner—David A. Simmons
Assistant Examiner—Minh-Chau T. Pham
(74) Attorney, Agent, or Firm—Dilworth & Barrese, LLP

(57) ABSTRACT

A vault for storing collectibles has a system for forcibly entering an incoming air, which after it has been filtered exits the vault along with undesirable substances trapped in a vault chamber.

19 Claims, 5 Drawing Sheets

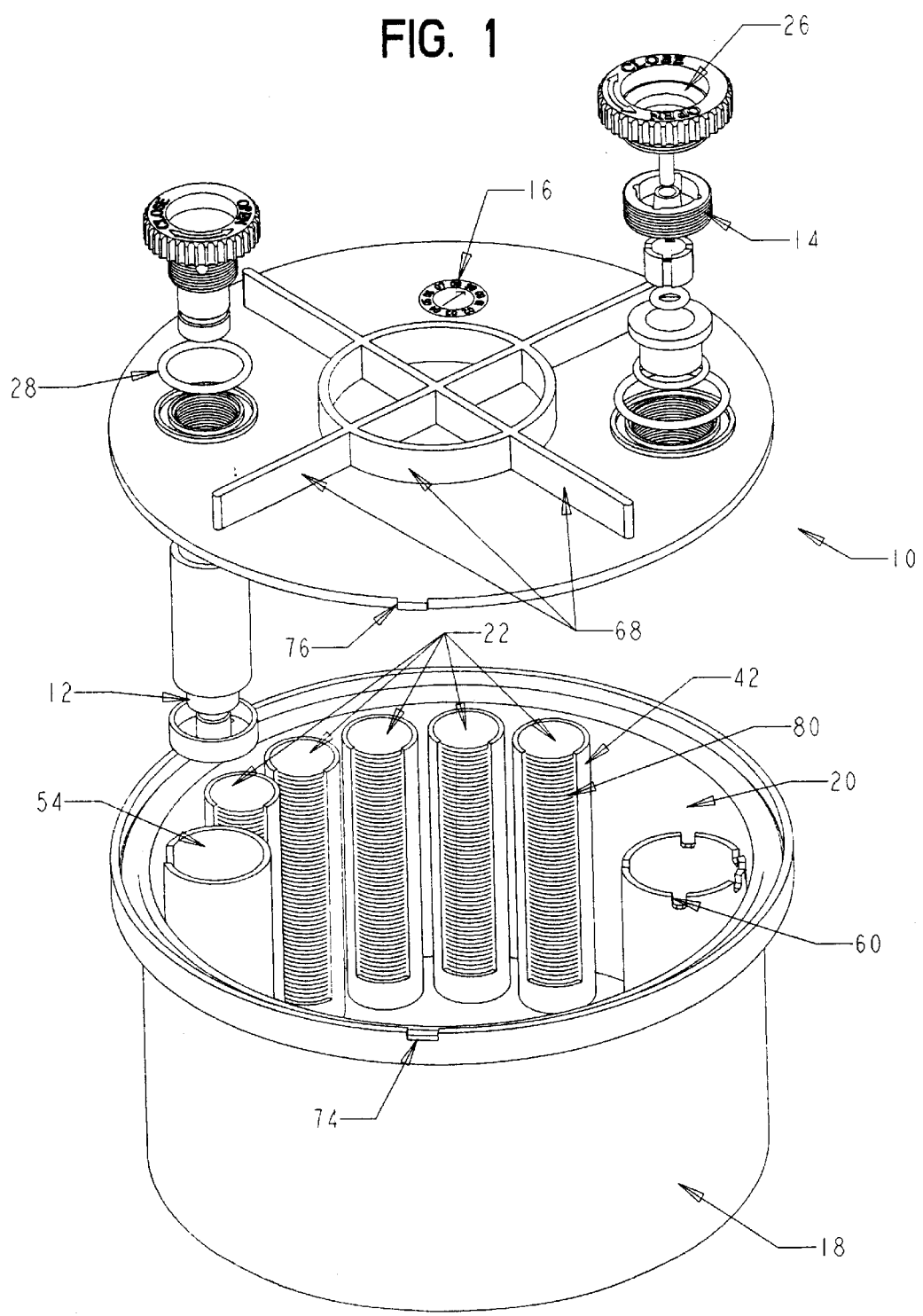

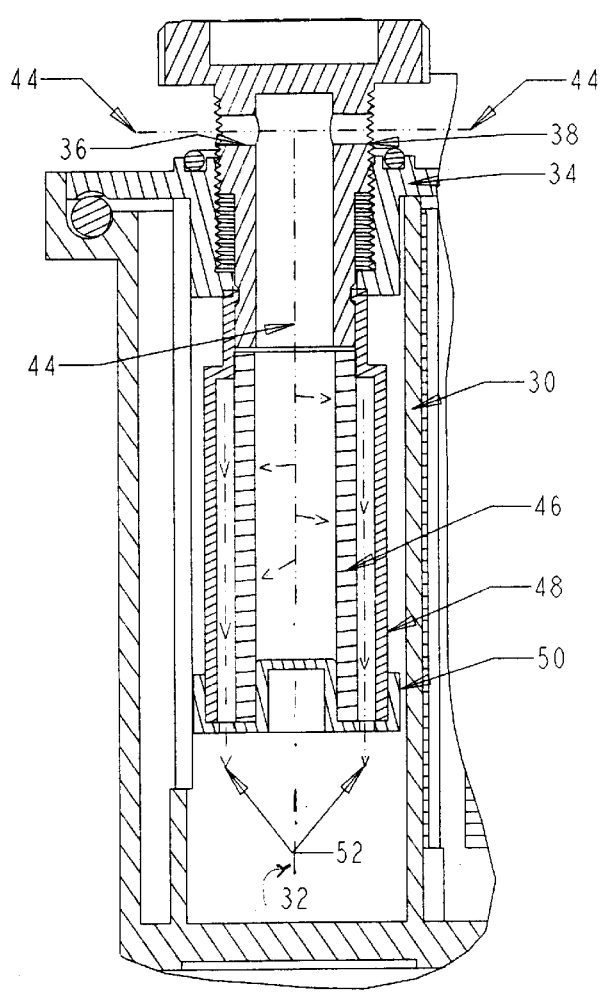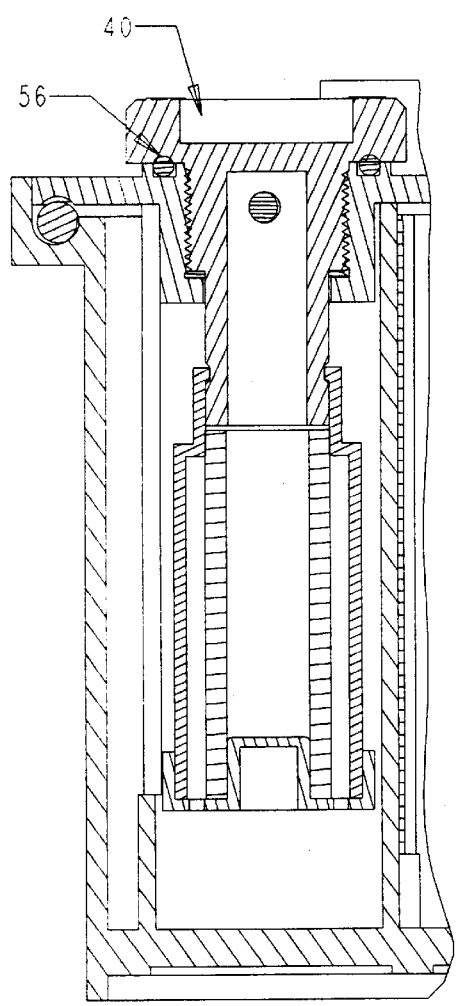

FILTERED VACUUM VAULT FOR STORING COLLECTIBLES

FIELD OF THE INVENTION

The present invention relates to a vault for storing varying collectibles including collectibles that tend to oxidize in the presence of air. Particularly, the invention relates to a vault for storing collectibles and provided with a system for preventing the collectibles from deterioration.

BACKGROUND OF THE INVENTION

Collecting various items has been known from the time immemorial. Among a great variety of collectible items, metallic objects such as coins, jewelry and the like are perhaps the oldest and one of the most widespread collectibles. Suffice it to say that numismatics has been a passion of billions of people throughout millenniums and, besides providing numismatists with the passion that is characteristic to all collectors, it also serves as a bridge into the recent and distant past, and sometimes future. Environmental factors, such as humidity, impurities, heat, UV radiation and the like, play the critical role in decolorization of collectible items which are not limited to metallic objects and may also include stamps for example. As a consequence, collectibles loose invaluable pieces of information, aesthetic appeal, and historic value. Understandably, oxidation is a major problem, which is associated not only with metallic items, but it also affects a great variety of other collectibles including, for example, paintings.

Furthermore, all of the above-discussed problems are equally applicable to a variety of food products. The most effective solution to the oxidation problem is placing a collectible item in an environment that has no contact or very limited contact with air. Accordingly, the ideal environment for preventing oxidation is vacuum. Many attempts have been made to preserve collectibles, some of which are discussed below.

U.S. Pat. No. 5,791,075 to Martell discloses a device for visibly displaying collectible items and including at least partially transparent cover and a one-way evacuation valve which is adapted to permit removal of air from the device. In operation, a collectible item is placed inside the device, and after an external source has been actuated, the air is evacuated from the device through the one-way valve.

While this device attacks a problem of oxidation, it may not be entirely efficient in removing impurities contained in the open air, which has been trapped inside the device before the beginning of a pumping operation. These impurities, thus, may still remain in the device after a vacuum has been created in the device and eventually contribute to deterioration of the displayed item.

Furthermore, the device, as disclosed in Martell, is a display device. Accordingly, it has the transparent cover which does not block a UV radiation causing, in turn, elevated temperatures inside the display device. The elevated temperatures however, may contribute to deterioration of the displayed item even in a vacuum created inside this device.

U.S. Pat. No. 3,943,987 to Rossi discloses a container capable of forming an airtight seal. An evacuation valve is provided on the container allowing the evacuation of air trapped therein after closing the container. Means are also provided to relieve the vacuum to facilitate opening the container.

Similarly to Martell discussed above, Rossi does not provide an assembly for preventing the impurities from entering the storage chamber with air. Furthermore, those impurities that have been left in the interior of this device are not later evacuated and therefore contribute to gradual deterioration of the stored food items.

U.S. Pat. No. 5,238,648 to Kremen discloses a hermetic enclosure assembly for preservation storage of objects susceptible to degradation by exposure conditions such as ultraviolet radiation, oxygen, humidity, microbial, fungal and insect species, internal activity and external acidic gases.

Similarly to the above-discussed references, Kremen does not disclose means for filtrating incoming air.

It is, therefore, desirable to provide a vault for storing items which are reliably protected from environmental factors capable of affecting the quality of these items. Also desirable is a vault which has an air-circulating system for evacuating contaminants that have been trapped inside the vault after it has been sealed. A vault for storing items, particularly collectible items, and having an air filtrating system, which prevents contaminants contained in the open air from entering the vault's interior, is also desirable.

SUMMARY OF THE INVENTION

In accordance with the invention, these objectives are achieved by a vault provided with an assembly that creates a stream of incoming outer air, which while flowing through an interior of the vault evacuates impurities from the interior as the stream exits the vault. To avoid penetration of incoming impurities into the interior of the vault, the assembly has a system filtering the incoming air before it enters the interior.

Thus, in accordance with a cardinal aspect of the invention, the vault chamber is traversed by incoming air which is drawn into the vault' interior or chamber upon creating a pressure differential between this chamber and an ambient atmosphere after the vault has been closed and an external vacuum source has been actuated. As the incoming air flows through an inlet port of the vault, a filtering system blocks impurities contained in the incoming air from entering the chamber.

As a result, the filtered air flowing through the chamber is further drawn out through a valve assembly, which is in flow communication with the external source, and carries along the moisture and contaminants present in the vault chamber time of sealing the interior. As a result of the filtered air, the oxidation process in the sealed vault is practically eliminated because the filtered air serves as a carrier effectively removing the contaminants and moisture, which may be trapped inside the vault chamber after it has been closed, from the vault's interior.

In accordance with a further aspect of the invention, in order to further prevent deterioration of the stored items, which are preferably collectible items that are prone to oxidation, the inventive vault is composed of a material preventing penetration of the UV rays into the vault's interior. Furthermore, to maintain the inside temperature at a desirable level, the vault preferably is made from a snow-white material. Preferably, the vault is molded in a thermo plastic white snow material five izod or better with a UV stabilizer package contained in this material. The use of the UV stabilizer package in the material allows it to keep the UV rays from darkening the vault's exterior over time, which would result in penetration UV rays and temperatures higher than an ambient temperature.

According to a further aspect of the invention, a removable part of the vault is reliably sealed to the vault's housing as the filtered air flows through the housing toward the valve assembly. This is achieved by providing a rate, at which the filtered air exits the vault chamber, higher than a rate at which it enters the filter assembly. Thus, even before reaching a vacuum state in the chamber, the removable part of the vault is reliably sealed to the housing.

According to a further aspect of the invention, the vault optionally may have a monitoring system for closing the filter assembly after a predetermined period of time, during which the filtered air travels through the interior, has lapsed.

Advantageously, the inventive vault is designed to store all the denomination coins and currency. For this purpose, the vault chamber has at least one coin chamber capable of receiving coins from the past, present and future. In addition, the camber may have a series of detachable coin chambers of the same or different size. Thus, once the coins are placed in the coin chamber and a vacuum is created, the vault chamber is free from moisture, humidity, dust, smoke, water, and any other environmental factor that can damage the stored items, such as coins. Note that any item which tends to deteriorate in the ambient atmosphere can be stored and preserved in the inventive vault.

It is, therefore an object of this invention to provide a vault for storing items that are reliably protected from environmental factors detrimentally affecting the stored items.

Another object of the invention is to provide a vault for storing items with an assembly which is capable of removing moisture, contaminants, and other factors affecting the value of stored items from the vault.

Yet another of the invention is to provide a vault for storing items with a filtering system preventing contaminants and impurities contained in an incoming air from entering the vault's interior or chamber.

A further object of the invention is to provide an economical power consumption system for creating vacuum in a vault chamber.

Yet another object of the invention is to provide a method for preventing items stored in the inventive vault from deterioration.

BRIEF DESCRIPTION OF THE DRAWINGS

The above and other objects, features and advantages will become more readily apparent from the following description of preferred embodiment accompanied with the following drawings, in which:

FIG. 1 is an exploded isometric view of a vault in accordance with the invention.

FIG. 2 is a sectional view of an elongated filter assembly taken along a longitudinal axis and shown in its open state.

FIG. 3 is a sectional view of an elongated filter assembly taken along a longitudinal axis and shown in its closed state.

SPECIFIC DESCRIPTION

Figure 4:
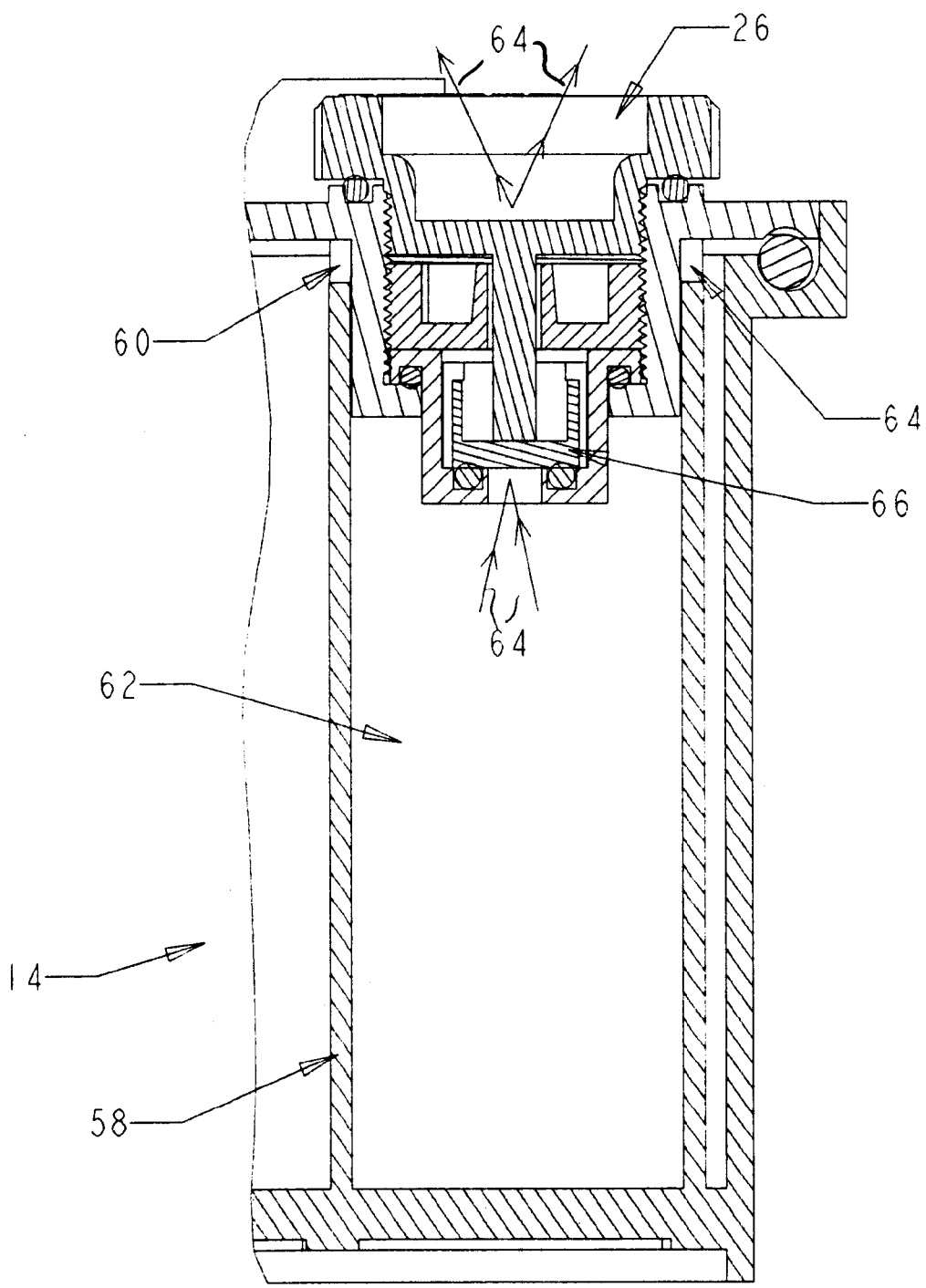
FIG. 4 is a sectional view of an elongated valve assembly taken along a longitudinal axis.

Referring to FIG. 1, a vault 10 has a filter assembly 12, a valve assembly 14 and a housing including a removable top 16 and a bottom 18 which is provided with a vault chamber 20. To prevent items 22, which are stored in the vault chamber 20, from deterioration, the top 16 is sealingly attached to the bottom 18, and a vacuum is created within the closed housing. This is achieved by connecting an external vacuum source 24 shown in FIG. 8 to the valve assembly which after is turned on generates a pressure differential to evacuating air from the sealed housing through an outlet port 26. However, just simply creating vacuum inside the vault chamber does not necessarily provide the items 22 with an environment free from contaminants, impurities and humidity which are largely responsible for deterioration of the stored items.

To prevent the sealed chamber from trapping undesirable elements, a stream of incoming air is drawn through at least one closable inlet port 28 into the vault chamber 20 after the external source has been attached to the outlet port 26. As a consequence, the incoming air traverses an interior of the vault and, while exiting through the outlet port 26, carries along impurities and moisture which otherwise would remain in the chamber after creating the vacuum.

However, to block contaminants and other hazardous substances, which are inherently contained in ambient air, from entering the vault chamber, the inlet ports are provided in the filter assembly 12, which is attached to the top 16. The filter assembly is capable of moving between its open state, as shown in FIG. 2, wherein the air is allowed to enter the vault chamber through the port or ports 28, and a closed state illustrated in FIG. 3. The closed state of the filter assembly allows the external source 2 to create vacuum inside the vault chamber within a short period of time.

Turning to FIGS. 2 and 3, the filter assembly 12 includes a housing 30, which is attached to the top and receives a filter body capable of sliding along a longitudinal axis 32 between the open and closed states. To provide displacement of the filter body, it has a flange 34 attached to the vault and sized and shaped so that a stem 36 can move relative to the flange. As illustrated, a threaded arrangement 38 accomplishes displacement of the stem. Note that the stem can be precisely machined to fit the flange or even the housing 30 in such a manner that it can slide relative to the flange upon applying an axial thrust which would overcome a frictional contact between an outer surface of the stem and an inner surface of a part receiving this stem.

The stem 36 is topped with a handle 40 to which a user applies a torque to unscrew the filter assembly in order to displace the stem from the top of the vault at a distance sufficient to provide flow communication between the inlet ports and an ambient environment. Note, although the filter and valve assemblies are disclosed as attached to the top of the vault, it is within the inventive scope to provide these assemblies on the bottom of the vault with certain obvious modification of item holders 42 (FIG. 1).

The stem 36 has an axial passage 44 in flow communication with the inlet ports and further has a filter 46 made from any suitable material that allows air to penetrate through but traps hazardous substances inside the axial passage. Having flown through the filter, the filtered air traverses a channel 48 formed between the filter 46 and an outer wall 50 of the filter assembly. To finally enter the vault chamber, the filtered air is drawn through a plurality of small passages 52, which are provided in the outer wall 50, and into the housing 30 and further through an axial slot 54 (FIG. 1) of the housing 30.

Thus, the filtered air, which is substantially free from impurities, contaminants, water droplets and some other undesirable substances, flows through the vault chamber along a flow path towards the valve assembly 14. While traversing the vault chamber, the filtered air collects undesirable substances which have been trapped in the chamber after closing the top 16. To ensure the airtight connection between the between the filter assembly and the ambient atmosphere after the top is closed, the flange 34 has a seal 56, which is an O-ring seal preferably made from any suitable material.

Referring to FIGS. 4 and 1, the valve assembly has a housing 58 which similarly to the housing 30 of the filter assembly is removably attached to the top 16 of the vault. At least one but preferably a plurality of peripheral notches 60 establishing flow communication between the vault chamber and an interior 62 of the housing 58 are machined in the housing's end portion. The airflow entering the interior 62 flows through a valve body, as indicated by arrows 64, and exits through the outlet port 26 which, in turn, is in flow communication with valve body. The valve body can be removably attached and sealed to the top 16 s by means of a threading assembly 66 for example.

The valve assembly further has a piston 66 which is normally closed under a spring force, and, thus, pushed inwardly to block air communication between an ambient atmosphere and the vault chamber. During vacuuming, as a result of a negative pressure generated by an external source, the spring force is equalized and the piston is displaced in its upward position to allow air from the vault chamber to traverse the outlet port. After a predetermined period of time, which is necessary first for removal of undesirable substances from the vault chamber and creating a vacuum, the spring force becomes a dominant force displacing the valve in its closed inward position to seal the valve body.

In a preferable embodiment of the valve assembly, when the vault is not under vacuum, the piston is displaced inwardly as a result of higher atmospheric pressure and gravity. However, after vacuum has been created in the vault chamber, the piston is displaced inwardly sealing off the interior of the vault. As a result, the vault chamber is under vacuum and substantially free from undesirable substances, which preserves the stored items in excellent condition as long as there is no flow communication between the interior and the ambient environment.

To further preserve the stored items 22 from deterioration caused by environmental factors, the housing of the vault is made from a material preventing the UV rays which cause elevated temperatures, from penetration into the vault chamber. Preferably, the vault is molded in a thermo plastic white snow material five izod or better with a UV stabilizer package contained in this material. However, any metallic or polymeric material that can provide the same advantages as the snow-white thermo plastic material can be readily used.

Figure 6:
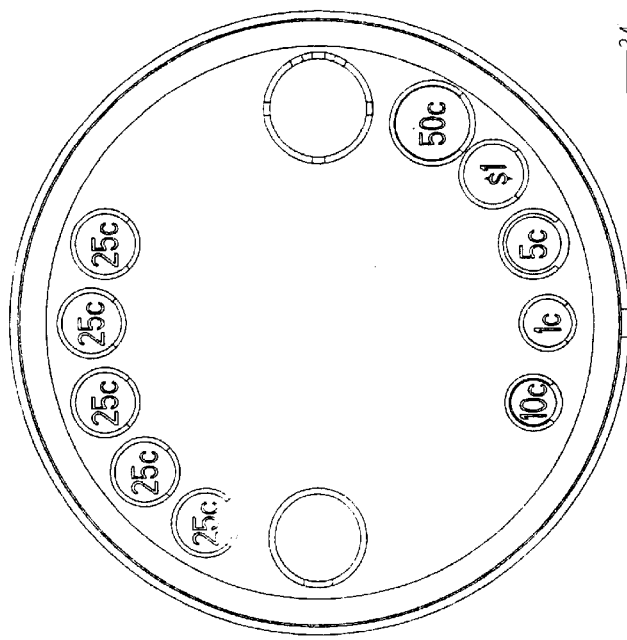
FIG. 6 is a bottom plane view of the vault in accordance with the invention.
Figure 5:
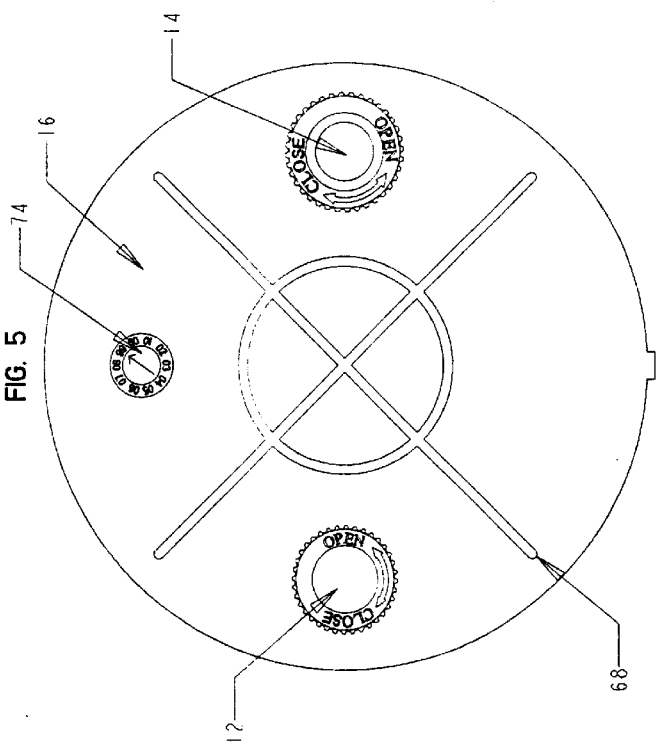
FIG. 5 is a plane view of an inner side of the vault's top in accordance with the invention.
Figure 7:
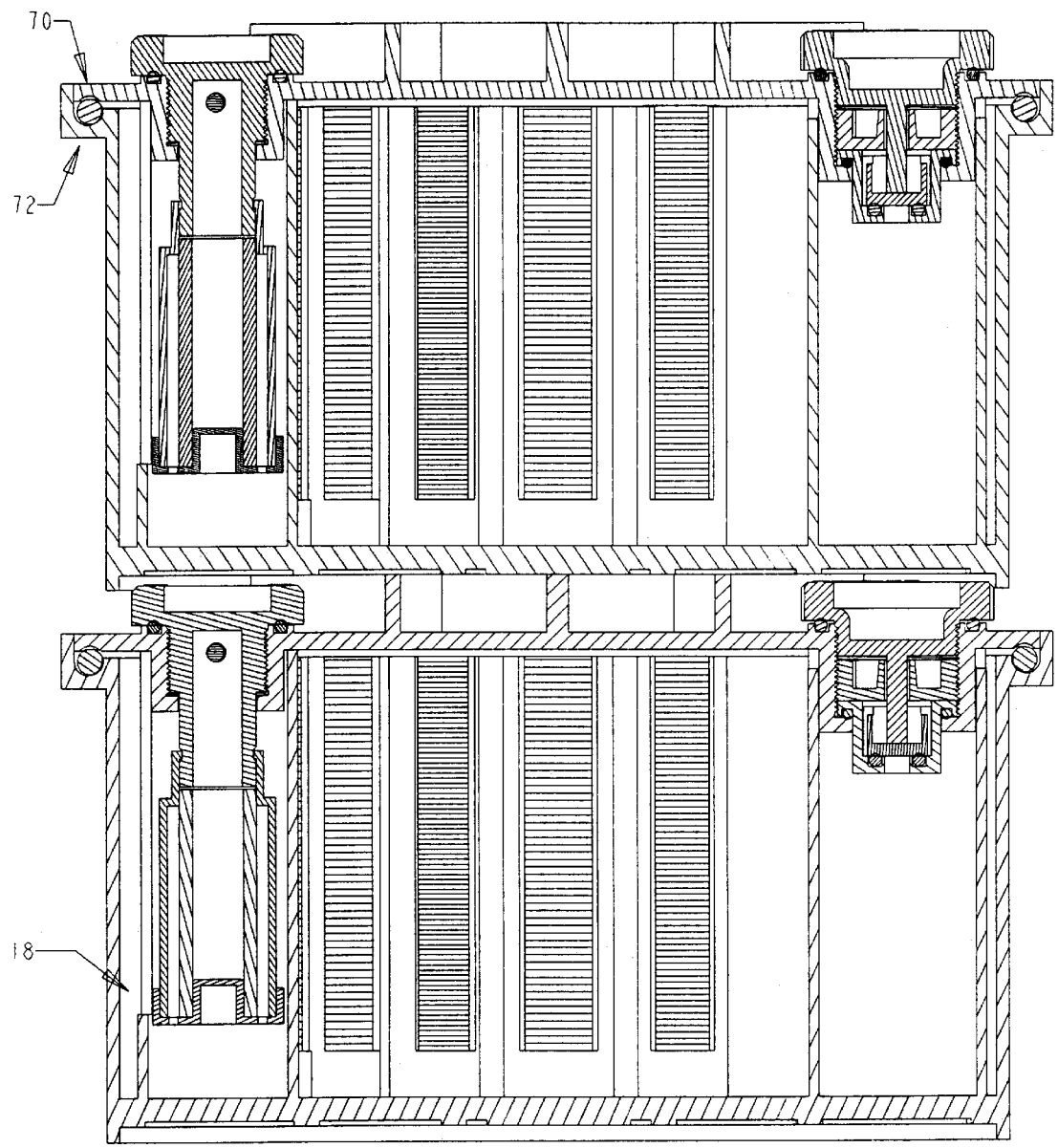
FIG. 7 is a sectional view of two vaults stacked upon one another in accordance with the invention.

Referring to FIGS. 1 and 5 and 6, the top 16 has an array of reinforcing ribs 68. As shown in FIG. 1, the array is shaped and sized to serve as a handle. Also, the array serves as a registering means for receiving another vault, the bottom of which is formed with an arrangement complementing the ribs when the vaults are stacked atop of one another. To provide a desirable registration between the top and the bottom of the vault housing, one of these two parts is formed with a peripheral notch 74, whereas the other part has a lip 74 received in the notch in a desirable closed position of the housing.

Returning to the filter and valve assemblies, it is noted that the cross-section of an outlet means including the outlet port 40 is greater than a cumulative cross section of the inlet ports 28. As a result, a rate at which air stream exits the vault chamber higher than a rate at which it the incoming air enters the filter assembly. As a consequence, as the external vacuum source is connected to the exit port, the atmospheric pressure is always grater than the pressure inside the vault. Accordingly, the top 16 is reliably,sealed against an O-ring 70 (FIG. 6) which is mounted in a trough 72 formed in the bottom 18 of the vault to ensure that all incoming air is directed through the filter assembly.

As shown in FIG. 6, the bottom 18 is design for storing specific types of items. The present embodiment serves as a vault for storing coins. To facilitate and properly place rolls of coins that can be stored in original packages, an arrangement of coin holder 42 are detachably mounted to the bottom. A variety of types of attachment can be utilized in the present invention, one of which, for example can simply be a snap-on arrangement. The coin holder can have different diameters to accommodate different coins. The top 16 of the vault has a rotatable year indicator 74 (FIG. 5) that can provide a user with a year the coins have been minted. In a particular embodiment, the coin holders has a central axial opening used to store annual government proof and mint sets in the original packaging and also proof silver and gold eagles, quarter bags and the like. Preferably, the vault chamber has five coin holders each holding commemorative coins for a particular state. A plurality of spacers 80 (FIG.) can be arranged between adjacent coins or between adjacent packages to facilitate their displacement.

Figure 8:
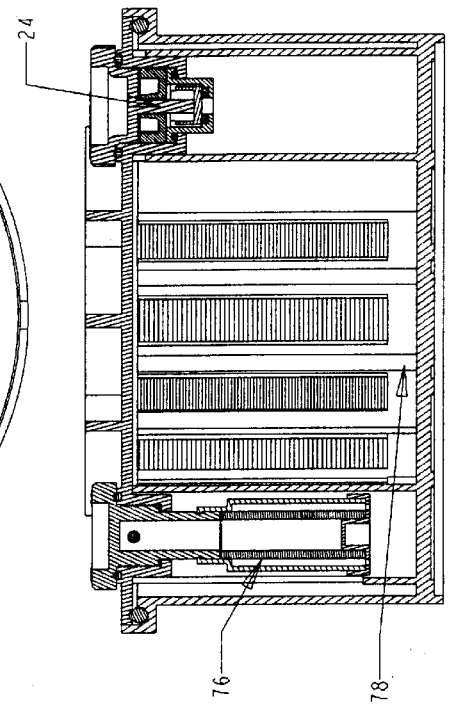
FIG. 8 is a sectional view of the vault in accordance with the invention which is provided with a control system for automatically terminating a sealing procedure.

Referring to FIG. 8, a system for controllably terminating a vacuuming process includes a pressure sensor 76 and a time relay 78. Thus, the filter assembly may be automatically closed after either a predetermined pressure in the vault chamber has been reached or after a desirable time period has passed. Once the filter assembly is closed, the vacuum can be generated within a time period ranging from a few seconds to a few minutes depending on a relative size of the inlet and outlet ports and capacity of the external source. As a result, a stored item or items are protected against UV light, moisture, humidity, dust, smoke, water and any other element that can damage items.

The above-disclosed structure should not be construed as limiting the scope of this invention but as merely providing illustrations of some of the presently preferred embodiments of this invention.

I claim:

1. A vault for collectables, comprising:
   a housing provided with a vault chamber for storing the collectables;
   a filter mounted on the housing and operating so that when the filter is open, incoming air is guided along a path through the filter into the vault chamber while being purified, and when the filter is closed, incoming air is blocked from entering the vault chamber;
   a valve spaced downstream from the filter and mounted displaceably to the housing so that when the valve is open, the vault is in flow communication with outside, and when the valve is displaced in a closed position, the flow communication is blocked; and
   a vacuum source downstream from and in flow communication with the valve and operable for creating a pressure drop between the upstream and downstream of the path sufficient to force the incoming air through the filter into the vault chamber, where the purified air collects impurities as it exits through the open valve, the valve being displaced in the closed position upon closing the filter as the vacuum source continues to work to create a vacuum in the particle-free vault chamber.

2. The vault defined in claim 1, wherein the housing is made from a material preventing penetration of rays within a UV frequency range into the vault chamber.

3. The vault defined in claim 2, wherein the material is selected from the group consisting of plastic and metal materials and a combination thereof.

4. The vault defined in claim 2, wherein the housing has a bottom, a top and a peripheral wall extending between the bottom and top, at least one of the top and bottom being detachable from the peripheral wall, said valve and said filter being displaceably mounted to one of said bottom and top which is detachable from the peripheral wall.

5. The vault defined in claim 4, wherein one of said bottom and top is provided with an arrangement of reinforcing ribs formed on an outer side, said detachable bottom or top being provided with a lip extending perpendicular to a plane of the detachable top or bottom and fitting a notch provided in said housing to establish a desired position of the detachable top or bottom.

6. The vault defined in claim 5, further comprising a date stamp indicating a year of manufacturing the collectibles, said date stamp having a displaceable year date indicator.

7. The vault defined in claim 5, wherein an outer side of the one of said bottom and top which is not detachable from the peripheral wall has a formation for receiving the arrangement of reinforcing ribs of another vault, whereby said vaults can be placed atop one another.

8. The vault defined in claim 1, wherein the vault chamber has an array of holders for the collectibles, said holders having a shape selected from the group consisting of polygonal and annular shape.

9. The vault defined in claim 8, wherein the collectibles are selected from the group consisting of coins, stamps, baseball cards, jewelry, commemorative memorabilia and combination thereof, said collectibles being oxidizable and tending to loose their aesthetic appeal and value, if left exposed to air for a relatively long time.

10. The vault defined in claim 8 wherein said array of holders includes a plurality of columns for coins of different denomination, each of said columns having a discontinuous peripheral wall and a plurality of spacers, wherein each of the spacers being mounted between adjacent coins.

11. The vault defined in claim 8 wherein each holder of said array is mounted detachably in said vault chamber, the vault further comprising a respective locator between the vault chamber and each holder, wherein the locator includes a projection formed on one of the vault chamber and the respective holder and a nest on the other one of the vault chamber and the holder.

12. The vault defined in claim 1, further comprising a valve chamber and a filter chamber, each of which has a size larger than a size of a respective one of said valve and filter, whereby said filter and filter chamber form a first air channel, and said valve and valve chamber form a second air channel, said valve chamber and filter chamber being of different sizes.

13. The vault defined in claim 12, wherein said filter is threadedly attached to the housing and has at least one inlet port, which allows the incoming air into said filter when said filter is open, said valve having an outlet port in flow communication with the at least one inlet port for providing exit of the filtered air through said second air channel which is in flow communication with said first air channel via said vault chamber.

14. The vault assembly defined in claim 13, wherein the outlet port has a cross-section greater than a cross-section of the at least one inlet port, whereby the incoming air is directed through the filter and is evacuated through said outlet port at a higher rate than a rate at which the incoming air enters the vault chamber to create said pressure drop in said vault chamber before completely sealing it.

15. The vault defined in claim 13, wherein the valve has a central passage in flow communication with said second air channel and with the vacuum source.

16. The vault defined in claim 1, further comprising at least one pressure sensor placed in the vault and operatively connected to the filter for automatically closing it after the pressure drop has been reached.

17. The vault assembly, defined in claim 1, further comprising a time relay operatively connected to the filter to close it after a desired period of time during which the pressure drop has been created expires.

18. The vault assembly defined in claim 1, wherein the valve includes a piston displaceable outwards from the vault chamber to define the open position of the valve in response to establishing the flow communication between the vacuum source and the valve is established when the filter is open, the piston being displaceable inwards to define the closed position of the valve upon creating the vacuum in the vault chamber after the filter has been closed.

19. A method for preserving collectible items from oxidation, comprising the steps of:

(a) opening a filter;

(b) providing an external vacuum source for generating pressure differential between an interior of a chamber and an outside, thereby forcing an ambient air into said filter;

(c) simultaneously with step (b) filtrating the forced ambient air in said filter, thereby allowing a filtered air to collect impurities accumulated in the interior of the chamber and to exit therefrom through a valve located downstream from said filter;

(d) controllably closing said filter while continuing to operate the external vacuum source thereby creating a vacuum in said chamber to prevent said stored collectibles from oxidation and deterioration; and (e) automatically closing said valve upon creating the vacuum in said chamber.

* * * * *